(12) United States Patent
Gurvich et al.

(10) Patent No.: US 11,890,852 B2
(45) Date of Patent: Feb. 6, 2024

(54) COMPOSITE STRUCTURES WITH DAMAGE DETECTION CAPABILITY

(71) Applicant: Hamilton Sundstrand Corporation, Charlotte, NC (US)

(72) Inventors: Mark R. Gurvich, Middletown, CT (US); Georgios S. Zafiris, Glastonbury, CT (US); Kevin Thomas Gryk, Marcy, NY (US); Brayton Reed, Rome, NY (US); Joyel M. Schaefer, Earlville, NY (US); Michael King, Sauquoit, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 105 days.

(21) Appl. No.: 17/212,831

(22) Filed: Mar. 25, 2021

(65) Prior Publication Data
US 2021/0299997 A1  Sep. 30, 2021

Related U.S. Application Data

(60) Provisional application No. 63/001,707, filed on Mar. 30, 2020.

(51) Int. Cl.
| | |
|---|---|
| *B32B 7/023* | (2019.01) |
| *B32B 33/00* | (2006.01) |
| *G01N 21/64* | (2006.01) |
| *G01N 21/88* | (2006.01) |

(52) U.S. Cl.
CPC .............. *B32B 7/023* (2019.01); *B32B 33/00* (2013.01); *G01N 21/6447* (2013.01);
(Continued)

(58) Field of Classification Search
CPC ... B32B 1/08; B32B 2250/20; B32B 2250/24; B32B 2260/023; B32B 2260/046;
(Continued)

(56) References Cited

U.S. PATENT DOCUMENTS

| 8,720,278 B1 | 5/2014 | Toivola et al. |
| 8,809,452 B2 | 8/2014 | Bruns et al. |
(Continued)

FOREIGN PATENT DOCUMENTS

| CN | 110549692 A | 12/2019 |
| EP | 2537666 A1 | 12/2012 |
(Continued)

OTHER PUBLICATIONS

Xu (CN 107401682), Nov. 28, 2017.*
(Continued)

*Primary Examiner* — Lawrence D Ferguson
(74) *Attorney, Agent, or Firm* — Kinney & Lange, P.A.

(57) ABSTRACT

A polymer-matrix fiber-reinforced composite structure includes a plurality of polymer composite layers having at least one polymer composite layer that includes a first polymer-matrix and a first fluorescent agent interspersed through the first polymer-matrix. Damage to the polymer composite structure results in a change in fluorescence at the point of damage. A method for detecting damage in the polymer composite structure described above including the steps of applying light having a wavelength selected to induce fluorescence in the first fluorescent agent to the polymer composite structure, detecting a detected fluorescence pattern, and comparing the detected fluorescence pattern to a predetermined normal fluorescence pattern.

20 Claims, 9 Drawing Sheets

(52) U.S. Cl.
CPC .... *G01N 21/8806* (2013.01); *B32B 2262/101* (2013.01); *B32B 2262/106* (2013.01); *B32B 2307/422* (2013.01); *B32B 2597/00* (2013.01); *B32B 2605/18* (2013.01); *G01N 2021/8845* (2013.01)

(58) Field of Classification Search
CPC .......... B32B 2262/02; B32B 2262/101; B32B 2262/106; B32B 2307/422; B32B 2307/514; B32B 2597/00; B32B 2605/18; B32B 27/08; B32B 27/12; B32B 27/18; B32B 33/00; B32B 5/26; B32B 7/023; G01N 2021/8472; G01N 2021/8845; G01N 21/6447; G01N 21/8806
See application file for complete search history.

(56) References Cited

U.S. PATENT DOCUMENTS

| | | | |
|---|---|---|---|
| 9,920,883 | B2 | 3/2018 | Leavitt et al. |
| 2006/0109676 | A1* | 5/2006 | Man Lo .................. G09F 13/22 362/555 |
| 2009/0067163 | A1* | 3/2009 | Au .......................... F21V 3/023 362/158 |
| 2012/0115719 | A1 | 5/2012 | Turner et al. |
| 2014/0151578 | A1 | 6/2014 | Glavind et al. |

FOREIGN PATENT DOCUMENTS

| | | |
|---|---|---|
| GB | 2194062 A | 2/1988 |
| WO | 2019042609 A1 | 3/2019 |

OTHER PUBLICATIONS

Extended European Search Report dated Aug. 4, 2021, received for corresponding European Application No. 21165197.1, seven pages.
Communication Pursuant to Article 94(3) EPC for EP Application No. 21165197.1, dated Jun. 9, 2023, 6 pages.

* cited by examiner

COMPOSITE STRUCTURES WITH DAMAGE DETECTION CAPABILITY

BACKGROUND

The present disclosure is generally related to a structure and method for detecting damage in polymer-matrix fiber-reinforced composite structures and more particularly to detecting damage at their external surfaces.

Polymer-matrix fiber-reinforced composite materials are often used in applications where weight is a key concern, as composite structures are lightweight. As a representative example, composite materials are broadly used in aircraft applications, where high structural performance can be achieved by relatively low weight structures in comparison with metallic structures. Composite materials, however, can be more sensitive to service damage, so having a reliable method of detection in composite structures is quite important. Such service damages can occur, for example, due to dropped tools or equipment, foreign object damage by debris, hails, etc., transportation or installation impacts, ballistic events, and so on. Relatively small damages can be particularly difficult to detect, making the inspection of parts difficult and/or subjective, time consuming, and expensive. Most composite structures are currently made without special capabilities for service damage detection. It makes corresponding inspections time- or/and cost-consuming by using either sophisticated but expensive automated structural health monitoring methods or applying simple visual assessment techniques with obvious risks of accuracy and disadvantage of intensive labor.

SUMMARY

In one aspect, a polymer-matrix fiber-reinforced composite structure includes a plurality of polymer-matrix composite layers. At least one of the polymer-matrix composite layers is made up of a polymer-matrix and a fluorescent agent interspersed through the first matrix. Damage to the polymer composite structure results in a change in fluorescence at the point of damage.

In another aspect, a method for detecting damage in a polymer-matrix fiber-reinforced composite structure includes applying light to the polymer-matrix fiber reinforced composite structure at a wavelength which has been selected to induce fluorescence in the fluorescent agent, detecting the fluorescence pattern, and comparing the fluorescence pattern to a predetermined normal fluorescence pattern without damage. The polymer-matrix fiber-reinforced composite structure includes a plurality of polymer-matrix composite layers. At least one of the polymer-matrix composite layers is made up of a polymer-matrix and the fluorescent agent interspersed through the polymer-matrix. Damage to the polymer composite structure results in a change in fluorescence at the point of damage.

In another aspect, a method for making a polymer-matrix fiber-reinforced composite structure includes providing a polymer, mixing a fluorescent agent into the polymer to forma fluorescent-based polymer, arranging a layup using the fluorescent-based polymer, and making the polymer-matrix fiber-reinforced composite structure by curing or solidifying the layup. The fluorescent agent is interspersed throughout the polymer-matrix. The polymer-matrix fiber-reinforced composite structure includes a plurality of polymer-matrix composite layers. At least one of the polymer-matrix composite layers is made up of a polymer-matrix and the fluorescent agent interspersed through the polymer-matrix. Damage to the polymer composite structure results in a change in fluorescence at the point of damage.

DETAILED DESCRIPTION

Polymer-matrix fiber-reinforced composite materials provide significant weight reduction, but they can be more sensitive to service damage. As such, it is very important to have frequent inspections to detect such damages to make decisions regarding corresponding actions, e.g., damage repair, replacement of the entire structure, or no actions at all (ignoring the damage event). Furthermore, parts made from polymer-matrix fiber-reinforced composite materials are often used in confined spaces which can be dark or difficult to access, especially in aircraft applications. As a result, regular inspection can be expensive, time consuming, difficult, and often unreliable with risks of either missing service damage or false detection. By adding a fluorescent agent to layers of the composite materials with or without reinforced fibers, simple inspection can be conducted by shining a light, for example UV light, onto the composite material, and looking for changes in the fluorescence pattern. By altering the fluorescent agent and/or its location within the composite material, the location, size, depth, extent of the damage, or a combination thereof, among other things, can be determined. This can be particularly useful for aircraft and rotorcraft composite components and, more specifically, drive shafts constructed from composite materials, as the driveshafts are often located in dark, confined spaces, making them particularly difficult to inspect. The composite materials described herein can be used in any composite part that requires regular inspection for service damage. Additionally, the intensity of the fluorescence can be quantified and used as a metric of damage size and/or severity.

Figure 1A:
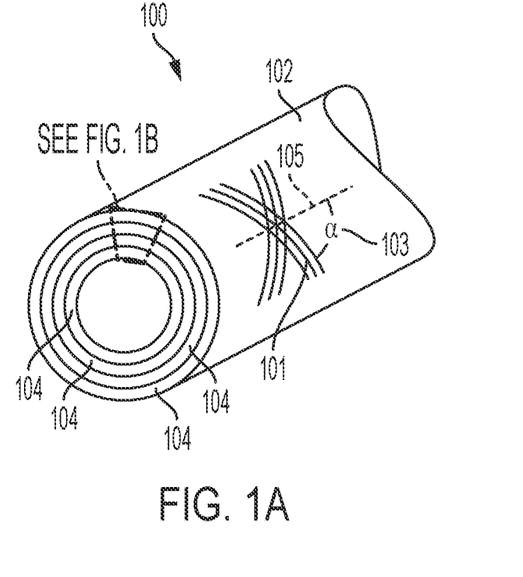
FIG. 1A is a perspective sectional view of a representative composite part.
Figure 1B:
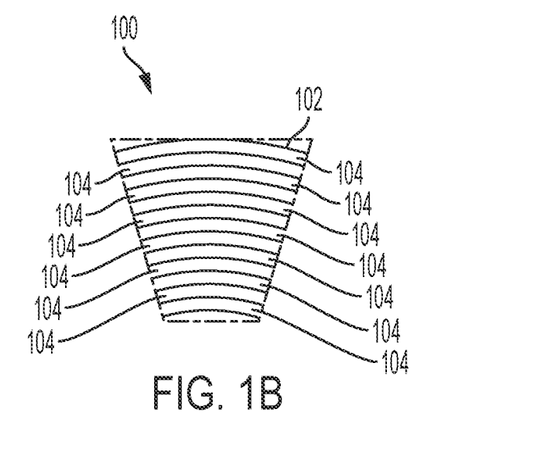
FIG. 1B is an enlarged perspective sectional view of the layers of polymer-matrix fiber-reinforced composite structure of FIG. 1A.

FIG. 1A is a perspective sectional view of a representative polymer-matrix fiber-reinforced composite structure. FIG. 1A shows polymer-matrix fiber-reinforced composite structure 100, orientation 101, composite material body 102, angle α 103, polymer-matrix composite layers 104, and axis 105. Composite material body 102 includes polymer-matrix composite layers 104. The layers are placed along orientations 101 defined by angles α 103 with respect to axis 105. The polymer-matric layers can be with or without fiber reinforcement. The layers can be continuous or discontinuous, for example, with ply-drops or with mutual overlapping. The layers can be arranged as laminated layups, as shown as example in FIG. 1A, or more complex 3D arrangements, for example, including though thickness reinforcement, or a combination of laminated layups and complex 3D arrangements. Polymer-matrix fiber-reinforced composite structure 100 includes composite material body 102. Composite material body 102 is made up of a plurality of polymer-matrix composite layers 104 with or without fiber reinforcement. Composite material body 102 can include at least one, at least two, at least five, or at least ten composite layers 104. In some embodiments, polymer-matrix fiber-reinforced composite structure 100 can additionally include a polymer layer without fiber reinforcement. In some embodiments, layers 104 can include a fluorescent agent additive in the polymer-matrix. FIG. 1B is an enlarged perspective sectional view of polymer-matrix composite layers 104 of polymer-matrix fiber-reinforced composite structure 100 of FIG. 1A.

Figure 1C:
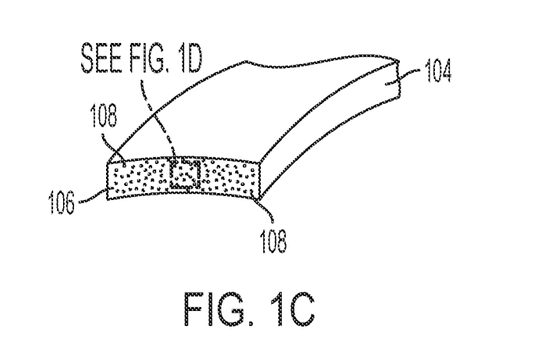
FIG. 1C is a perspective sectional view of a layer of the polymer-matrix fiber-reinforced composite structure of FIG. 1A.

FIG. 1C is a perspective sectional view of a polymer-matrix composite layer 104 of composite material body 102 of FIG. 1A. Polymer-matrix composite layer 104 is made up of polymer 106 embedded with reinforcing fibers 108. Polymer 106 can be made of, for example, thermoset resins, thermoplastics, or some combination thereof. Examples of thermoset resins include polyurethanes, epoxies, polyimides, bis-maleimides, sulphonamide-melamine-paraformaldehyde polymer resin, benzoguanamine-formaldehyde copolymer, polyester amide co-polymers, and examples of thermoplastic resins include polyetherimide, polyetheretherketone, polyeherketoneketone, thermoplastic polyimide, polyamideimide, polyethersulfone. Polymer 106 can additionally include one or more additives that alter the properties of the material, for example, fluorescent agents, dyes, or strengthening agents. These additives can be the same or different between layers. The additives can have different concentrations in different layers. Distribution of the additives within the layers can be uniform or non-uniform and can include domains with no additives at all. Additives can be present in some layers, but not in others. In some embodiments polymer 106 includes one or more fluorescent agents. Fluorescent agents are compounds which emit light in the visible spectrum when exposed to a certain wavelength or spectrum of light. Different fluorescent agents can emit different wavelengths of visible light. In some embodiments, the fluorescent agents emit light when exposed to UV light, with wavelength exposure between about 250 to 380 nm, between about 275 and 375 nm, or between about 300 and 370 nm, with the black light ~365 nm as a preferred embodiment. The fluorescent agent can comprise, for example, anthra-thioxantene, thioxanthene benzanthrone, anthraquinone series compounds, xanthene, benzothioxanthene-dicarboximide, aminoketone series compounds, hydroxycoumarin, coumarin, coumarin 480, glycidyl-oxcoumarin, benzopyran derivatives, azomethine derivatives, naphthalimide derivative, perylene derivatives, UV fluorescent thermoset resin pigments, or combinations thereof. In some embodiments, concentration of the UV dies/additives in the polymer can be, for example, between 0.005% and 15% of weight, between 0.007% and 10% of weight, or between 0.01% and 1% of weight. In other embodiments, this concentration can be higher than 15% of weight or lower than 0.005% of weight. Fluorescent agents can be present in at least one layer, at least three layers, or at least five layers, for example. If fluorescent agents are present in more than one layer, the fluorescent agents, or combinations thereof, in each layer can be the same or different from the other layers. The fluorescent agents can be interspersed throughout the polymer-matrix. When fluorescent agents are interspersed throughout the polymer-matrix, molecules of the fluorescent agent(s) are found between individual portions of the polymer(s) chains.

Figure 1D:
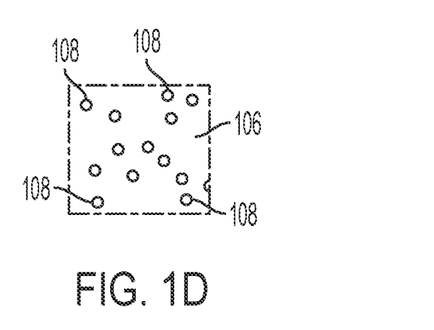
FIG. 1D is an enlarged cross-sectional view of the layer of FIG. 1C.

One or more layers 104 can include reinforcing fibers 108. Examples of reinforcing fibers 108 include carbon fibers, glass fibers, organic fibers, or combinations thereof. The fibers can be, for example, a series of fibers arranged unidirectionally within the layer, a woven fabric, or short fibers. The fibers of one layer can be oriented in the same direction or a different direction from other layers. FIG. 1D is an enlarged cross-sectional view of layer 104 of FIG. 1C.

Figure 2A:
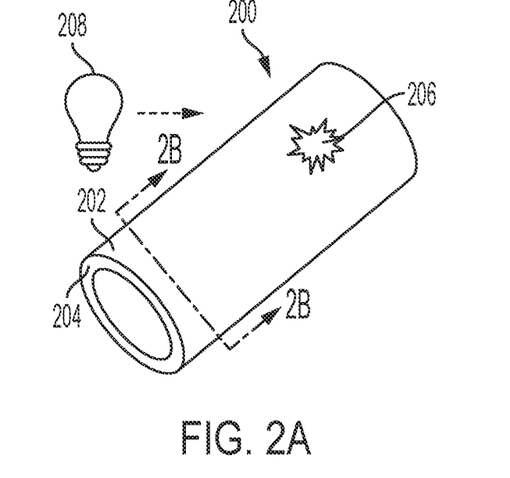
FIG. 2A is a perspective view of a representative polymer-matrix fiber-reinforced composite structure having a fluorescent coating with damage detected.
Figure 2B:
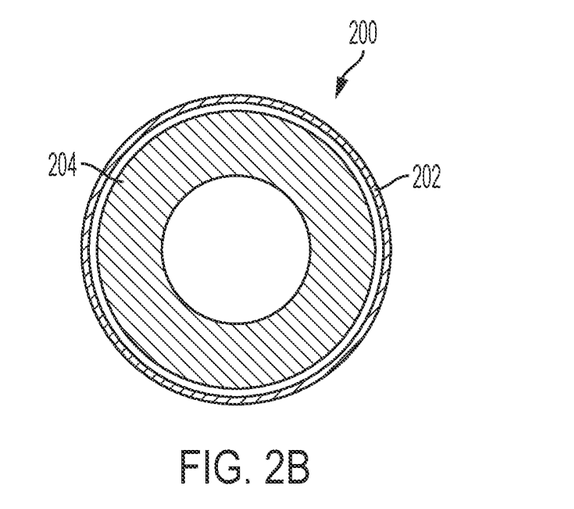
FIG. 2B is a cross-section of the representative polymer-matrix fiber-reinforced composite structure of FIG. 2A.

FIG. 2A is a perspective view of a representative polymer-matrix fiber-reinforced composite structure having a fluorescent-based layer with damage detected. FIG. 2B is a cross-section of the representative polymer-matrix fiber-reinforced composite structure of FIG. 2A. FIGS. 2A and 2B show polymer-matrix fiber-reinforced composite structure 200, fluorescent-based layer 202, composite material body 204, service damage 206, and light source 208. Polymer-matrix fiber-reinforced composite structure 200 is made up of composite material body 204 covered with fluorescent-based layer 202 on the outer circumference. Fluorescent-based layer 202 is a polymer-matrix composite layer with a fluorescent agent interspersed throughout the polymer-matrix. In other words, fluorescent-based layer 202 can be made of a fluorescent agent interspersed in a polymer-matrix optionally with additional additives, reinforcing fibers, or a combination thereof as described above. If damage 206 has occurred to the part, a portion of fluorescent-based layer 202 is disturbed (chipped, cracked, removed, punctured, etc.). When light source 208 exposes fluorescent-based layer 202 to light in the desired wavelength or spectrum, the fluorescent-based layer 202, which is undisturbed, will emit visible light, while damage 206 will not because no fluorescent agent is present. In other embodiments, damaged area 206 still can emit visible light, but its intensity is much lower, in sharp contrast with neighboring undamaged areas.

Figure 3A:
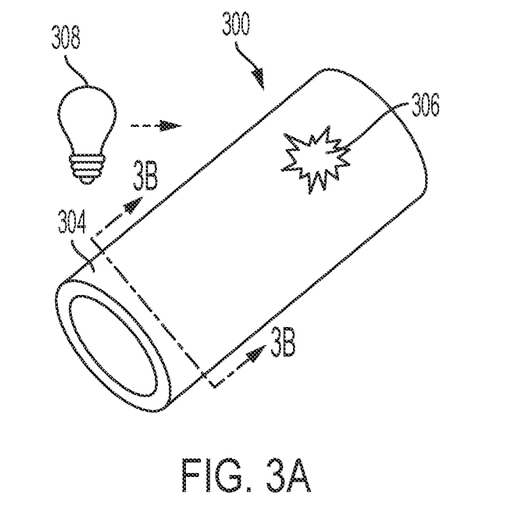
FIG. 3A is a perspective view of a representative polymer-matrix fiber-reinforced composite structure having a fluorescent-based layer with damage detected.
Figure 3B:
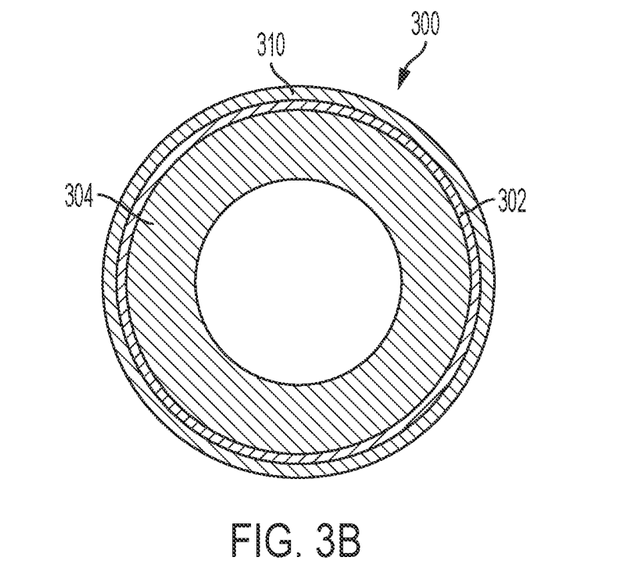
FIG. 3B is a cross-section of the representative polymer-matrix fiber-reinforced composite structure of FIG. 3A.

FIG. 3A is a perspective view of a representative polymer-matrix fiber-reinforced composite structure having a fluorescent-based layer with damage detected. FIG. 3B is a cross-section of the representative polymer-matrix fiber-reinforced composite structure of FIG. 3A. FIGS. 3A and 3B show polymer-matrix fiber-reinforced composite structure 300, fluorescent-based layer 302, composite material body 304, damage 306, light source 308, and polymer-matrix composite layer 310. Polymer-matrix fiber-reinforced composite structure 300 is made up of composite material body 304 with fluorescent-based layer 302 in the composite material body 304 with polymer-matrix composite layer 310 as the outer most layer. Fluorescent-based layer 302 can be any layer in composite material body 304. Fluorescent-based layer 302 can be made of a fluorescent agent interspersed in a polymer-matrix with optional additional additives, reinforcing fibers, or a combination thereof as described above. If damage 306 has occurred to the part deep enough to reach fluorescent-based layer 302, a portion of composite material body 304 is disturbed (chipped, cracked, removed, punctured, etc.), exposing at least a portion of fluorescent-based layer 302. When light source 308 exposes fluorescent-based layer 302 to light in the desired wavelength or spectrum, the undisturbed composite material body 304 will not emit visible light, while damage 306 will fluoresce because the fluorescent agent in fluorescent-based layer 302 has been exposed.

Figure 4A:
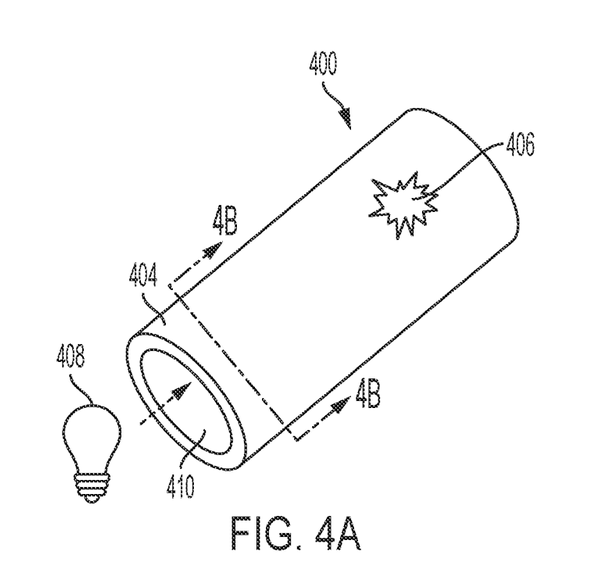
FIG. 4A is a perspective view of a representative polymer-matrix fiber-reinforced composite structure having a fluorescent coating with damage detected.
Figure 4B:
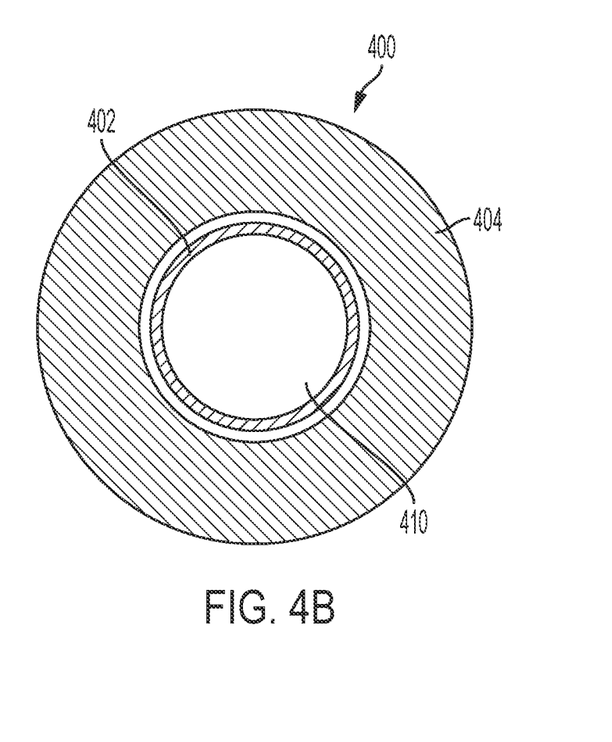
FIG. 4B is a cross-section of the representative polymer-matrix fiber-reinforced composite structure of FIG. 4A.

FIG. 4A is a perspective view of a representative polymer-matrix fiber-reinforced composite structure having a fluorescent-based layer with damage detected. FIG. 4B is a cross-section of the representative polymer-matrix fiber-reinforced composite structure of FIG. 4A. FIGS. 4A and 4B show polymer-matrix fiber-reinforced composite structure 400, fluorescent-based layer 402, composite material body 404, damage 406, light source 408, and inner lumen 410. Polymer-matrix fiber-reinforced composite structure 400 is made up of composite material body 404 with fluorescent-based layer 402 covering the inner surface 410 of composite material body 404. Fluorescent-based layer 402 can be made of a fluorescent agent interspersed in a polymer-matrix optionally with additional additives, reinforcing fibers, or a combination thereof as described above. If damage 406 is severe and has occurred to the part deep enough to reach or penetrate fluorescent-based layer 402, a portion of composite material body 404 is disturbed (chipped, cracked, removed, punctured, etc.), exposing at least a portion of fluorescent-based layer 402. When light source 408 is emitted through inner lumen 410 onto fluorescent-based layer 402 in the desired wavelength or spectrum, the undisturbed composite material body 404 will not emit visible light, while damage 406 will fluoresce because the fluorescent agent in fluorescent-based layer 402 has been exposed.

Figure 5A:
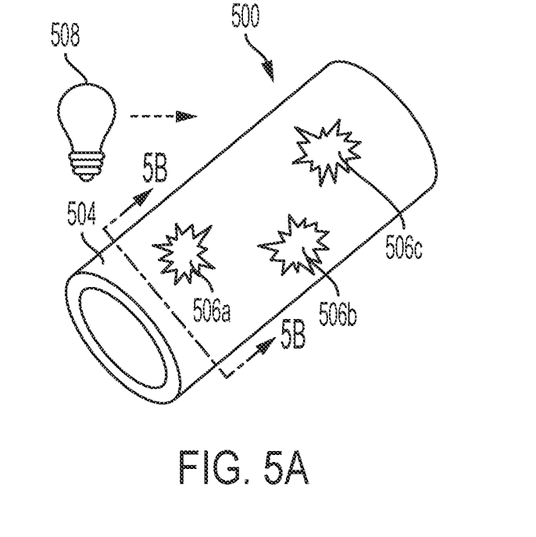
FIG. 5A is a perspective view of a representative polymer-matrix fiber-reinforced composite structure having multiple fluorescent-based layers with damage detected.
Figure 5B:
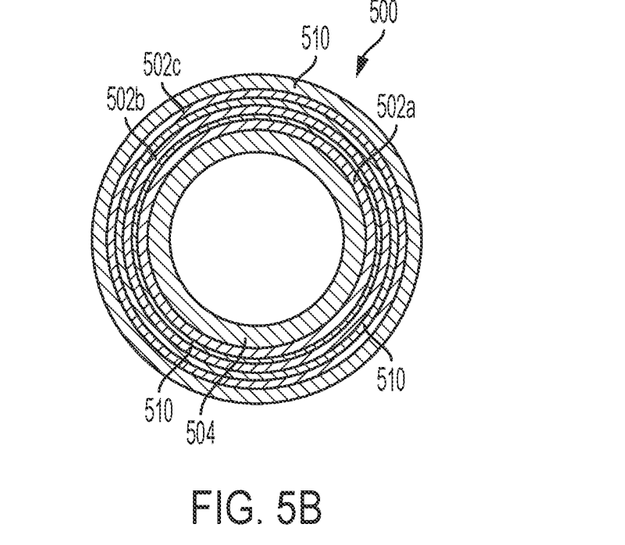
FIG. 5B is a cross-section of the representative polymer-matrix fiber-reinforced composite structure of FIG. 5A.

FIG. 5A is a perspective view of a representative polymer-matrix fiber-reinforced composite structure having a plurality of fluorescent-based layers with damage detected. FIG. 5B is a cross-section of the representative polymer-matrix fiber-reinforced composite structure of FIG. 5A. FIGS. 5A and 5B show polymer-matrix fiber-reinforced composite structure 500, fluorescent-based layers 502a, 502b, 502c, composite material body 504, damages 506a, 506b, 506c, light source 508, and polymer-matrix composite layers 510. Polymer-matrix fiber-reinforced composite structure 500 is made up of composite material body 504 with fluorescent-based layers 502a, 502b, 502c within composite material body 504 and with one of polymer-matrix composite layers 510 as the outermost layer. Polymer-matrix fiber-reinforced composite structure 500 could optionally include fluorescent-based layer on the outermost surface, as described above. Fluorescent-based layers 502a, 502b, 502c can be made of a fluorescent agent interspersed in a polymer-matrix optionally with additional additives, reinforcing fibers, or a combination thereof as described above. Each fluorescent-based layer 502a, 502b, 502c can have a different fluoresced wavelength. Each fluorescent-based layer can have different concentration of fluorescent agents with different intensity to emit visible light. If damage 506a, 506b, 506c has occurred to the part deep enough to reach at least one of fluorescent-based layers 502a, 502b, 502c, a portion of at least one polymer-matrix composite layer 510 is disturbed (chipped, cracked, removed, punctured, etc.), exposing at least a portion of at least one of fluorescent-based layers 502a, 502b, 502c. When light source 508 emits the desired wavelength or spectrum of light onto composite material body 504 in the desired wavelength or spectrum, the undisturbed polymer-matrix composite layers 510 will not emit visible light, while damage 506a, 506b, 506c will emit light because the fluorescent agent in at least one of fluorescent-based layers 502a, 502b, 502c has been exposed. The depth of damage 506a, 506b, 506c can be determined by the wavelength(s) of light fluoresced. While example shown in FIG. 5 illustrates design with three layers, other embodiments can include, for example, two fluorescent-based layers, four fluorescent based layers, or more than four fluorescent-based layers.

Figure 6A:
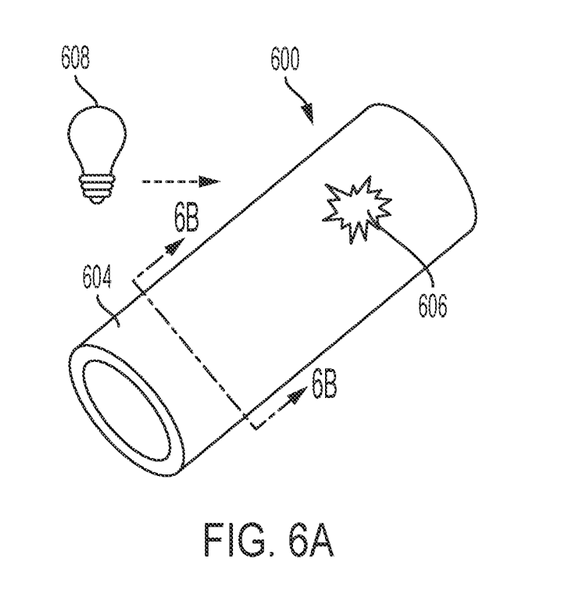
FIG. 6A is a perspective view of a representative polymer-matrix fiber-reinforced composite structure having multiple fluorescent-based layers with damage detected.
Figure 6B:
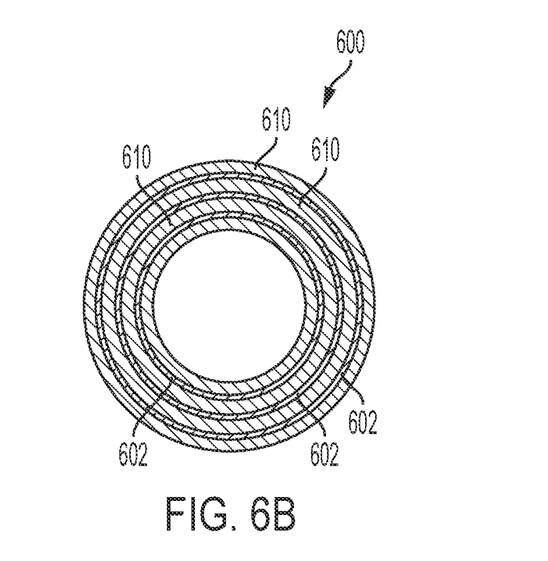
FIG. 6B is a cross-section of the representative polymer-matrix fiber-reinforced composite structure of FIG. 6A.

FIG. 6A is a perspective view of a representative polymer-matrix fiber-reinforced composite structure having a plurality of fluorescent-based layers with damage detected. FIG. 6B is a cross-section of the representative polymer-matrix fiber-reinforced composite structure of FIG. 6A. FIGS. 6A and 6B show polymer-matrix fiber-reinforced composite structure 600, fluorescent-based layers 602, composite material body 604, damages 606, light source 608, and polymer-matrix composite layers 610. Polymer-matrix fiber-reinforced composite structure 600 is made up of composite material body 604 with fluorescent-based layers 602 within composite material body 604 and with one of composite material layers 610 as the outermost layer. Polymer-matrix composite layers 610 do not have fluorescent agents for a better contrast with fluorescent-based layers 602. In some embodiments, fluorescent-based layers 602 can be partial layers sandwiched between polymer-matrix composite layers 610. In other embodiments, polymer-matrix composite layers 610 can be partial layers sandwiched between fluorescent-based layers 602. In further embodiments, fluorescent-based layers 602 and polymer-matrix composite layers 610 are both complete layers placed fully between each other. Polymer-matrix fiber-reinforced composite structure 600 could optionally include fluorescent-based layer 602 as described above as the outermost layer. Fluorescent-based layers 602 can be made of a fluorescent agent interspersed in a polymer-matrix optionally with additional additives, reinforcing fibers, or a combination thereof as described above. Each fluorescent-based layer can have the same or different fluoresced wavelength. If damage 606 has occurred to the part deep enough to reach at least one of fluorescent-based layers 602, a portion of at least one of polymer-matrix composite layers 610 is disturbed (chipped, cracked, removed, punctured, etc.), exposing at least a portion of at least one of fluorescent-based layers 602. When light source 608 emits the desired wavelength or spectrum of light onto composite material body 604 in the desired wavelength or spectrum, the undisturbed polymer-matrix composite layers 610 will not emit visible light, while damage 606 will emit light because the fluorescent agent in at least one of fluorescent-based layers 602 has been exposed. The depth of damage 606 can be determined by the pattern of light fluoresced, with clear contrast between layers 602 and 610.

Figure 7:
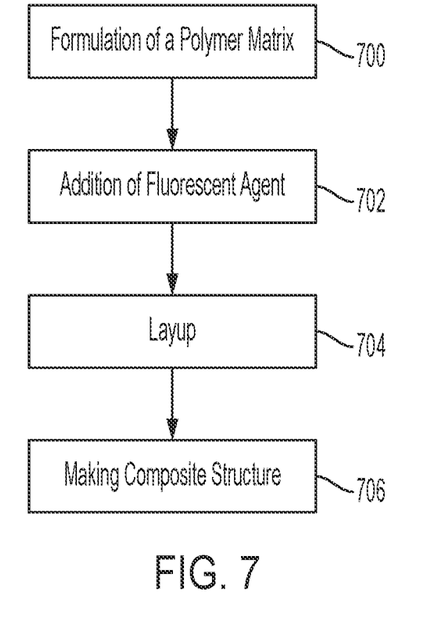
FIG. 7 is a flow diagram illustrating a representative method of making a composite described herein.

FIG. 7 is a flow diagram of a representative method of making a polymer-matrix fiber-reinforced composite structure described herein. The method includes formulation of a polymer-matrix 700, addition of fluorescent agent 702, layup 704, and making composite structure 706. In formulation of a polymer-matrix 700, thermoset or thermoplastic polymer can be used. The fluorescent agent 702 can be added to the polymer-matrix 700, for example, as a powder or liquid. The polymer with the added fluorescent agent can then be used in layup 704. Layup designs of a polymer-matrix fiber-reinforced composite structure can include, for example, laminated arrangement with or without ply-drops, filament-winding, braided, or arranging by automated fiber placing. The exact method of making composite structure 706 depends on the polymer-matrix used. In case of thermosets, for example, the generated layup 704 can be cured. In case of thermoplastics, for example, the generated layup can be solidified.

Figure 8A:
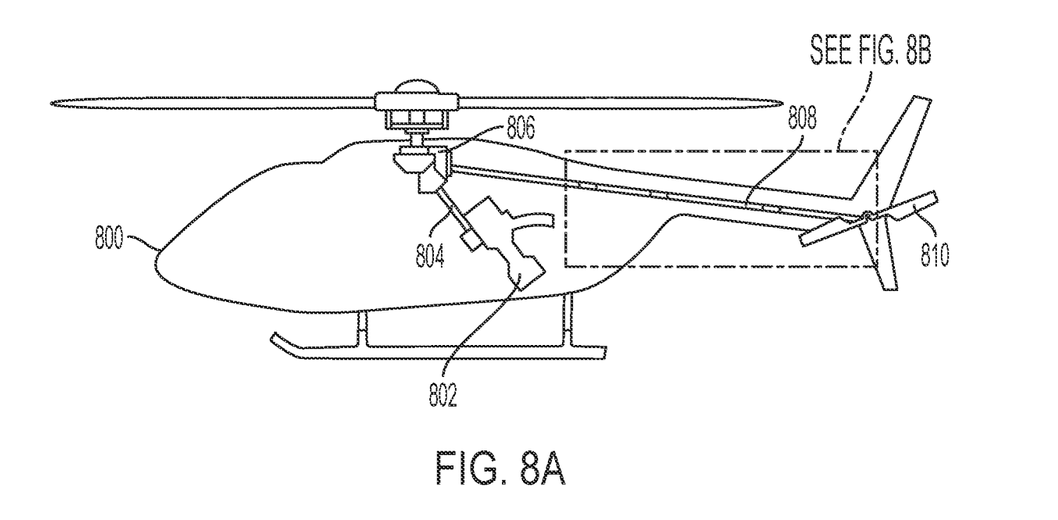
FIG. 8A is a schematic drawing of a driveshaft made of a representative composite material in use in a helicopter.
Figure 8B:
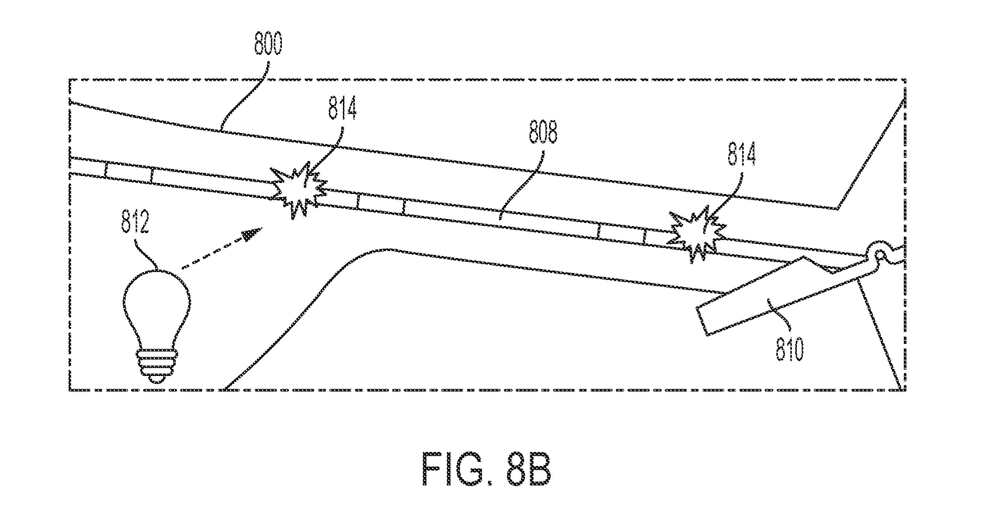
FIG. 8B is a sectional view of the driveshaft of FIG. 8A with damage detection.

FIG. 8A is a schematic sectional view of a driveshaft made of a representative composite material in use in a helicopter. FIG. 8B is a sectional view of the driveshaft of FIG. 8A with damage detected. FIGS. 8A and 8B show helicopter 800, engine 802, drive shaft 804, tail rotor reduction gear 806, tail rotor drive shaft 808, tail rotor 810, light source 812, and damage 814. Helicopter 800 includes engine 802. Engine 802 turns drive shaft 804, which in turn rotates tail rotor reduction gear 806 and tail rotor drive shaft 808. Tail rotor driveshaft 808 turns tail rotor 810. Tail rotor driveshaft 808 is made of composite material with a fluorescent-based layer as described above. In FIG. 8B damage 814 is detected by shining light source 812 onto tail rotor driveshaft 808. Damage 814 fluoresces as described above.

Figure 9:
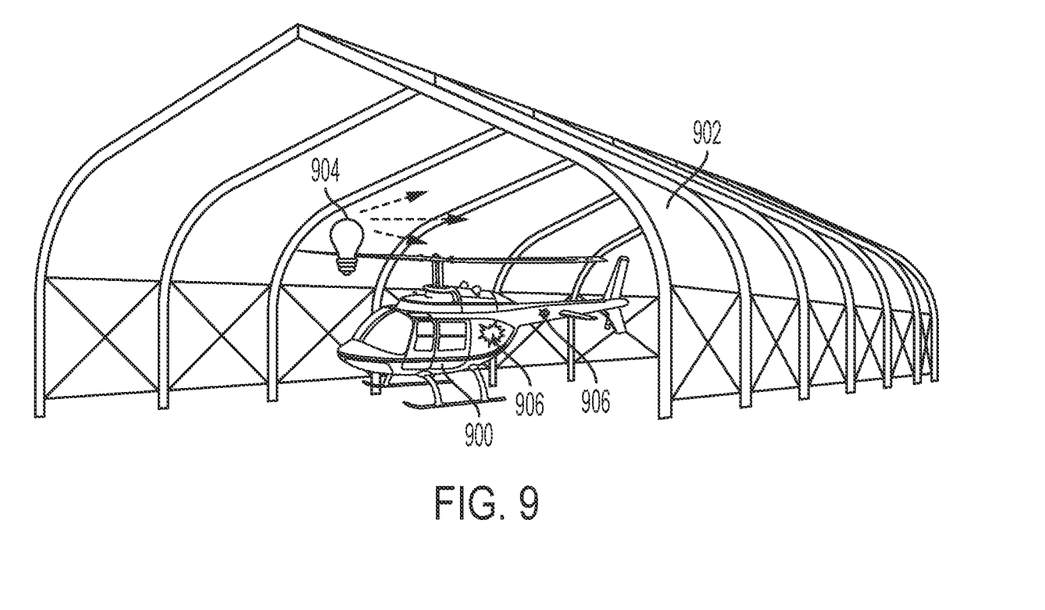
FIG. 9 is a perspective view of a method for representative damage detecting at the fuselage of an aircraft.

FIG. 9 is a drawing of a representative method for detecting damage to the fuselage of a representative aircraft (helicopter). FIG. 9 shows helicopter 900, shelter 902, light source 904, and damage 906. Helicopter 900 has a body made of composite material with a fluorescent-based layer as described above. Helicopter 900 is placed inside shelter 902. Shelter 902 decreases ambient light around helicopter 900 to the point that fluorescence can be seen. After the ambient light is decreased, light source 904 shines light in the desired spectrum, as described above, onto helicopter 900. Damage 906 fluoresces as described above. The same technique can also be used outside shelters, if ambient conditions are associated with darkness, e.g., during nights with no or limited illumination.

Discussion of Possible Embodiments

The following are non-exclusive descriptions of possible embodiments of the present invention.

A polymer-matrix fiber-reinforced composite structure, the structure comprising: a plurality of layers each comprising a polymer-matrix composite, the plurality of layers comprising a first layer; wherein the first layer comprises a first polymer-matrix and a first fluorescent agent interspersed through the first polymer-matrix, the structure being configured such that damage to one of the layers results in a change in fluorescence observable from the at least first layer at the point of damage.

The structure of the preceding paragraph can optionally include, additionally and/or alternatively, any one or more of the following features, configurations and/or additional components:

A further embodiment of the foregoing structure wherein the first layer is an outermost layer of the structure.

A further embodiment of any of the foregoing structures wherein first layer is between different layers.

A further embodiment of any of the foregoing structures wherein the plurality of polymer composite layers further comprises a second layer comprising a second polymer-matrix and a second fluorescent agent interspersed throughout the second polymer-matrix.

A further embodiment of any of the foregoing structures wherein the first fluorescent agent and the second fluorescent agent comprise the same compound.

A further embodiment of any of the foregoing structures wherein the first fluorescent agent and the second fluorescent agent are not the same compound.

A further embodiment of any of the foregoing structures wherein the first fluorescent agent is selected from the group consisting of anthra-thioxantene, thioxanthene benzanthrone, anthraquinone series compounds, xanthene, benzo-thioxanthene-dicarboximide, aminoketone series compounds, hydroxycoumarin, coumarin, coumarin 480, glycidyl-oxcoumarin, benzopyran derivatives, azomethine derivatives, naphthalimide derivative, perylene derivatives, and combinations thereof.

A further embodiment of any of the foregoing structures wherein the first polymer-matrix is a thermoset material or a thermoplastic material.

A further embodiment of any of the foregoing structures wherein the polymer-matrix fiber-reinforced composite structure is reinforced by carbon fibers, glass fibers, organic fibers, or a combination thereof.

A further embodiment of any of the foregoing structures wherein the polymer-matrix fiber-reinforced composite structure is an aircraft part.

A further embodiment of any of the foregoing structures wherein the polymer-matrix fiber-reinforced composite structure is a driveshaft.

A method for detecting damage in a polymer-matrix fiber-reinforced composite structure, the structure comprising a plurality of layers each comprising a polymer-matrix composite, the plurality of layers comprising a first layer, wherein the first layer comprises a first polymer-matrix and a first fluorescent agent interspersed through the first polymer-matrix, the structure being configured such that damage to one of the layers results in a change in fluorescence observable from the at least first layer at the point of damage, the method comprising: applying light having a wavelength selected to induce fluorescence in the first fluorescent agent to the polymer-matrix fiber-reinforced composite structure; detecting a detected fluorescence pattern; and comparing the detected fluorescence pattern to a predetermined normal fluorescence pattern without damage.

The method of the preceding paragraph can optionally include, additionally and/or alternatively, any one or more of the following features, configurations and/or additional components:

A further embodiment of the foregoing method further comprising removing the polymer-matrix fiber-reinforced composite structure from ambient light prior to applying the light having the wavelength to induce fluorescence in the first fluorescent agent.

A further embodiment of any of the foregoing methods wherein the wavelength corresponds to ultraviolet (UV) light.

A further embodiment of any of the foregoing methods wherein the fluorescence occurs in a visible light spectrum.

A further embodiment of any of the foregoing methods wherein the predetermined normal fluorescence pattern is non-fluorescence in the polymer-matrix fiber-reinforced composite structure, and fluorescence in the detected fluorescence pattern indicates damage.

A further embodiment of any of the foregoing methods wherein the predetermined normal fluorescence pattern is fluorescence in the polymer-matrix fiber-reinforced composite structure, and non-fluorescence or reduced fluorescence in the detected fluorescence pattern indicates damage.

A further embodiment of any of the foregoing methods wherein the plurality of layers further comprises a second layer, wherein the second layer comprises a second polymer-matrix and a second fluorescent agent interspersed through the second polymer-matrix; and wherein the presence or absence of fluorescence corresponding to the first fluorescent agent and the second fluorescent agent in the detected fluorescence pattern indicates a depth of damage.

A method for making a polymer-matrix fiber-reinforced composite structure, the structure comprising the structure comprising a plurality of layers each comprising a polymer-matrix composite, the plurality of layers comprising a first layer, wherein the first layer comprises a first polymer-matrix and a first fluorescent agent interspersed through the first polymer-matrix, the structure being configured such that damage to one of the layers results in a change in fluorescence observable from the at least first layer at the point of damage, the method comprising: providing a polymer; mixing the first fluorescent agent into the polymer to form a fluorescent-based polymer; arranging a layup using the fluorescent-based polymer; and making the polymer-matrix fiber-reinforced composite structure by curing or solidifying the layup; wherein the first fluorescent agent is interspersed throughout the first polymer-matrix.

The method of the preceding paragraph can optionally include, additionally and/or alternatively, any one or more of the following features, configurations and/or additional components:

A further embodiment of the foregoing method wherein the polymer-matrix comprises thermoset material or a thermoplastic material and wherein making the polymer-matrix fiber reinforced composite structure comprises curing the thermoset material or solidifying the thermoplastic material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A polymer-matrix fiber-reinforced composite structure, the structure comprising:
   a plurality of layers each comprising a polymer-matrix composite, the plurality of layers comprising a first layer;
   wherein the first layer comprises a first polymer-matrix and a first fluorescent agent interspersed through the first polymer-matrix, the structure being configured such that damage to one of the layers results in a change in fluorescence observable from the at least first layer at the point of damage.

2. The structure of claim 1 wherein the first layer is an outermost layer of the structure.

3. The structure of claim 1 wherein the first layer is between different layers.

4. The structure of claim 1 wherein the plurality of layers further comprises a second layer, where in the second layer comprises a second polymer-matrix and a second fluorescent agent interspersed throughout the second polymer-matrix.

5. The structure of claim 4 wherein the first fluorescent agent and the second fluorescent agent comprise the same compound.

6. The structure of claim 4 wherein the first fluorescent agent and the second fluorescent agent are not the same compound.

7. The structure of claim 1 wherein the first fluorescent agent is selected from the group consisting of anthra-thioxantene, thioxanthene benzanthrone, anthraquinone series compounds, xanthene, benzothioxanthene-dicarboximide, aminoketone series compounds, hydroxycoumarin, coumarin, coumarin 480, glycidyl-oxcoumarin, benzopyran derivatives, azomethine derivatives, naphthalimide derivative, perylene derivatives, and combinations thereof.

8. The structure of claim 1 wherein the first polymer-matrix is a thermoset material or a thermoplastic material.

9. The structure of claim 1 wherein the polymer-matrix fiber-reinforced composite structure is reinforced by carbon fibers, glass fibers, organic fibers, or a combination thereof.

10. The structure of claim 1 wherein the polymer-matrix fiber-reinforced composite structure is an aircraft part.

11. The structure of claim 10 wherein the polymer-matrix fiber-reinforced composite structure is a driveshaft.

12. A method for detecting damage in a polymer-matrix fiber-reinforced composite structure, the structure comprising a plurality of layers each comprising a polymer-matrix composite, the plurality of layers comprising a first layer, wherein the first layer comprises a first polymer-matrix and a first fluorescent agent interspersed through the first polymer-matrix, the structure being configured such that damage to one of the layers results in a change in fluorescence observable from the at least first layer at the point of damage, the method comprising:
   applying light having a wavelength selected to induce fluorescence in the first fluorescent agent to the polymer-matrix fiber-reinforced composite structure;
   detecting a detected fluorescence pattern; and
   comparing the detected fluorescence pattern to a predetermined normal fluorescence pattern without damage.

13. The method of claim 12 further comprising removing the polymer-matrix fiber-reinforced composite structure from ambient light prior to applying the light having the wavelength to induce fluorescence in the first fluorescent agent.

14. The method of claim 12 wherein the wavelength corresponds to ultraviolet (UV) light.

15. The method of claim 12 wherein the fluorescence occurs in a visible light spectrum.

16. The method of claim 12 wherein the predetermined normal fluorescence pattern is non-fluorescence in the polymer-matrix fiber-reinforced composite structure, and fluorescence in the detected fluorescence pattern indicates damage.

17. The method of claim 12 wherein the predetermined normal fluorescence pattern is fluorescence in the polymer-matrix fiber-reinforced composite structure, and non-fluorescence or reduced fluorescence in the detected fluorescence pattern indicates damage.

18. The method of claim 12 wherein the plurality of layers further comprises a second layer, wherein the second layer comprises a second polymer-matrix and a second fluorescent agent interspersed through the second polymer-matrix; and wherein the presence or absence of fluorescence corresponding to the first fluorescent agent and the second fluorescent agent in the detected fluorescence pattern indicates a depth of damage.

19. A method for making a polymer-matrix fiber-reinforced composite structure, the structure comprising a plurality of layers each comprising a polymer-matrix composite, the plurality of layers comprising a first layer, wherein the first layer comprises a first polymer-matrix and a first fluorescent agent interspersed through the first polymer-matrix, the structure being configured such that damage to one of the layers results in a change in fluorescence observable from the at least first layer at the point of damage, the method comprising:

providing a polymer;

mixing the first fluorescent agent into the polymer to form a fluorescent-based polymer;

arranging a layup using the fluorescent-based polymer; and making the polymer-matrix fiber-reinforced composite structure by curing or solidifying the layup;

wherein the first fluorescent agent is interspersed throughout the first polymer-matrix.

20. The method of claim 19 wherein the polymer-matrix comprises thermoset material or a thermoplastic material and wherein making the polymer-matrix fiber-reinforced composite structure comprises curing the thermoset material or solidifying the thermoplastic material.

* * * * *